US011359642B2

(12) United States Patent
Iizuka et al.

(10) Patent No.: US 11,359,642 B2
(45) Date of Patent: Jun. 14, 2022

(54) ELECTRIC COMPRESSOR

(71) Applicant: IHI Corporation, Tokyo (JP)

(72) Inventors: Kuniaki Iizuka, Tokyo (JP); Yuji Sasaki, Tokyo (JP); Tatsumi Inomata, Tokyo (JP); Ryosuke Yumoto, Tokyo (JP); Kai Iijima, Tokyo (JP); Tatsuya Fukui, Tokyo (JP); Hikaru Sugiura, Tokyo (JP); Yoshihito Katsu, Tokyo (JP); Takashi Yoshida, Tokyo (JP); Takashi Mori, Tokyo (JP)

( * ) Notice: Subject to any disclaimer, the term of this patent is extended or adjusted under 35 U.S.C. 154(b) by 0 days.

(21) Appl. No.: 17/124,614

(22) Filed: Dec. 17, 2020

(65) Prior Publication Data

US 2021/0102551 A1  Apr. 8, 2021

Related U.S. Application Data

(63) Continuation of application No. PCT/JP2019/020964, filed on May 27, 2019.

(30) Foreign Application Priority Data

Jul. 20, 2018  (JP) ............................. JP2018-137137

(51) Int. Cl.
*F04D 29/42* (2006.01)
*F04D 17/10* (2006.01)
(Continued)

(52) U.S. Cl.
CPC ......... *F04D 29/4206* (2013.01); *F04D 17/10* (2013.01); *F04D 25/0606* (2013.01); *F04D 29/706* (2013.01)

(58) Field of Classification Search
CPC .... F04D 17/10; F04D 25/0606; F04D 25/082; F04D 29/4206; F04D 29/706; H02K 5/10
See application file for complete search history.

(56) References Cited

U.S. PATENT DOCUMENTS 5,350,039 A  9/1994 Voss et al.
6,102,672 A  8/2000 Woollenweber et al.
(Continued)

FOREIGN PATENT DOCUMENTS

CN  102192146  9/2011
CN  104929956  9/2015
(Continued)

OTHER PUBLICATIONS

International Search Report dated Aug. 20, 2019 for PCT/JP2019/020964.
(Continued)

*Primary Examiner* — Michael Lebentritt
*Assistant Examiner* — Julian B Getachew
(74) *Attorney, Agent, or Firm* — Soei Patent & Law Firm (57) ABSTRACT

This electric compressor includes a rotation shaft including a first end and a second end, a compressor impeller which is mounted on the first end of the rotation shaft and includes a back surface facing the second end, a motor disposed between the first end and the second end of the rotation shaft, a wall portion which separates an impeller space and a motor space from each other and includes a reference wall surface having a shape along the back surface of the compressor impeller, and a bypass hole which is formed in the wall portion to connect the impeller space to the motor space and includes a first opening which opens to the impeller space. In the wall portion, a recessed portion which is disposed around the first opening of the bypass hole and recessed from the reference wall surface is formed.

15 Claims, 4 Drawing Sheets

(51) Int. Cl.
*F04D 25/06* (2006.01)
*F04D 29/70* (2006.01)

(56) References Cited

U.S. PATENT DOCUMENTS

| | | | |
|---|---|---|---|
| 6,129,524 A * | 10/2000 | Woollenweber | F04D 17/12 |
| | | | 417/366 |
| 9,664,194 B2 * | 5/2017 | Oleson | F04D 19/002 |
| 9,689,263 B2 * | 6/2017 | Gharaibah | F04D 27/0292 |
| 2011/0219809 A1 | 9/2011 | Kurihara | |
| 2015/0267709 A1 | 9/2015 | Hoshino et al. | |
| 2017/0152792 A1 | 6/2017 | Hornbach et al. | |
| 2018/0119703 A1 | 5/2018 | Gashi | |
| 2018/0209436 A1 | 7/2018 | Iizuka et al. | |
| 2018/0320583 A1 | 11/2018 | Sasaki et al. | |
| 2019/0085862 A1 | 3/2019 | Kawaguchi | |

FOREIGN PATENT DOCUMENTS

| | | |
|---|---|---|
| CN | 106536890 | 3/2017 |
| CN | 107454927 | 12/2017 |
| JP | 2001-515991 | 9/2001 |
| JP | 2007-263417 | 10/2007 |
| JP | 2009-041551 | 2/2009 |
| JP | 2017-057482 | 7/2018 |
| JP | 2018-145910 | 9/2018 |
| JP | 2017-141877 | 11/2018 |
| WO | 2015/188028 | 12/2015 |
| WO | 2017/168950 | 10/2017 |

OTHER PUBLICATIONS

International Preliminary Report on Patentability with Written Opinion dated Feb. 4, 2021 for PCT/JP2019/020964.

* cited by examiner

ELECTRIC COMPRESSOR

CROSS-REFERENCE TO RELATED APPLICATION

This application is a continuation application of PCT Application No. PCT/JP2019/020964, filed May 27, 2019, the entire contents of which are incorporated herein by reference.

BACKGROUND

As described in PCT international Publication No. WO2015/188028, an electric compressor in which a wall portion which faces a back surface of an impeller of a compressor has a hole portion which connects a compressor space to a motor space is known. The connection from the compressor space to the motor space has an advantage in which a pressure difference between these spaces is reduced. Also, as described in Japanese Unexamined Patent Publication No. 2009-041551, an electric compressor in which a groove portion is provided in an inner surface of a compressor housing and the groove portion is connected to a cylindrical portion of a casing (a gas-liquid separating means) via a condensed water path is known. Some of the condensed water is discharged to the cylindrical portion through the condensed water path together with some of intake air.

SUMMARY

An electric compressor according to one aspect of the disclosure includes a rotation shaft having a rotation axis and including a first end and a second end in a direction of the rotation axis, a compressor impeller mounted on the first end of the rotation shaft and including a back surface facing the second end, a motor disposed between the first end and the second end of the rotation shaft and configured to rotate the rotation shaft and the compressor impeller, a wall portion disposed between the compressor impeller and the motor and configured to separate an impeller space in which the compressor impeller is located and a motor space in which a motor is located from each other, the wall portion including a reference wall surface facing the back surface of the compressor impeller and having a shape along the back surface, and a bypass hole formed in the wall portion, passing through the wall portion and configured to connect the impeller space to the motor space, the bypass hole including a first opening that opens to the impeller space. A recessed portion disposed around the first opening which is an end edge of the bypass hole and recessed from the first opening and the reference wall surface is formed in the wall portion.

DETAILED DESCRIPTION

An electric compressor according to one aspect of the disclosure includes a rotation shaft having a rotation axis and including a first end and a second end in a direction of the rotation axis, a compressor impeller mounted on the first end of the rotation shaft and including a back surface facing the second end, a motor disposed between the first end and the second end of the rotation shaft and configured to rotate the rotation shaft and the compressor impeller, a wall portion disposed between the compressor impeller and the motor and configured to separate an impeller space in which the compressor impeller is located and a motor space in which a motor is located from each other, the wall portion including a reference wall surface facing the back surface of the compressor impeller and having a shape along the back surface, and a bypass hole formed in the wall portion, passing through the wall portion and configured to connect the impeller space to the motor space, the bypass hole including a first opening that opens to the impeller space. A recessed portion disposed around the first opening which is an end edge of the bypass hole and recessed from the first opening and the reference wall surface is formed in the wall portion.

During an operation of the electric compressor, the bypass hole which connects the impeller space to the motor space reduces a pressure difference between the two spaces. Then, when a temperature thereof is reduced after the operation is stopped, condensed water may adhere on the wall portion and the like which face the back surface of the compressor impeller. This condensed water flows down on the reference wall surface. When the condensed water flows near the bypass hole, the condensed water flows into the recessed portion disposed around the first opening of the bypass hole. Since the recessed portion is recessed from the first opening and the reference wall surface, entering of the condensed water into the bypass hole from the first opening is curbed. According to the electric compressor, it is possible to curb entering of condensed water into the motor space through the bypass hole.

In some aspects, the bypass hole is disposed below the rotation axis. In this case, a larger amount of condensed water can be guided to the recessed portion. Collection of the condensed water is realized.

In some aspects, the recessed portion is formed on the entire circumference of the first opening of the bypass hole. In this case, the condensed water flowing near the bypass hole is guided to the recessed portion. Since there is no path connected from the reference wall surface to the first opening, introduction of the condensed water into the bypass hole is prevented.

In some aspects, a discharge surface which is inclined with respect to the rotation axis and is directed toward the impeller space is formed at a lower end of the recessed portion. In this case, the condensed water which has been introduced into the recessed portion flows on the discharge surface and drops downward. Although a volume of the recessed portion is limited, the condensed water in the recessed portion can be smoothly discharged through the inclined discharge surface.

In some aspects, the first opening of the bypass hole is located at the same position as the reference wall surface in the direction of the rotation axis, or at a position toward the second end from the reference wall surface in the direction of the rotation axis. When the first opening protrudes toward the first end side further than the reference wall surface, the first opening comes close to the back surface of the compressor impeller. Such a structure may affect an aerodynamic performance of a compressor. When the first opening of the bypass hole is at the above-described position, the pressure difference between the impeller space and the motor space can be reduced without affecting the aerodynamic performance of the compressor.

Hereinafter, an example of die disclosure will be described with reference to the drawings. In the description of the drawings, the same elements will be designated by the same reference symbols, and duplicate description will be omitted. In the following description, the terms "radial direction" and "circumferential direction" are used with reference to a rotation shaft 12 or a rotation axis X, unless otherwise specified.

Figure 1:
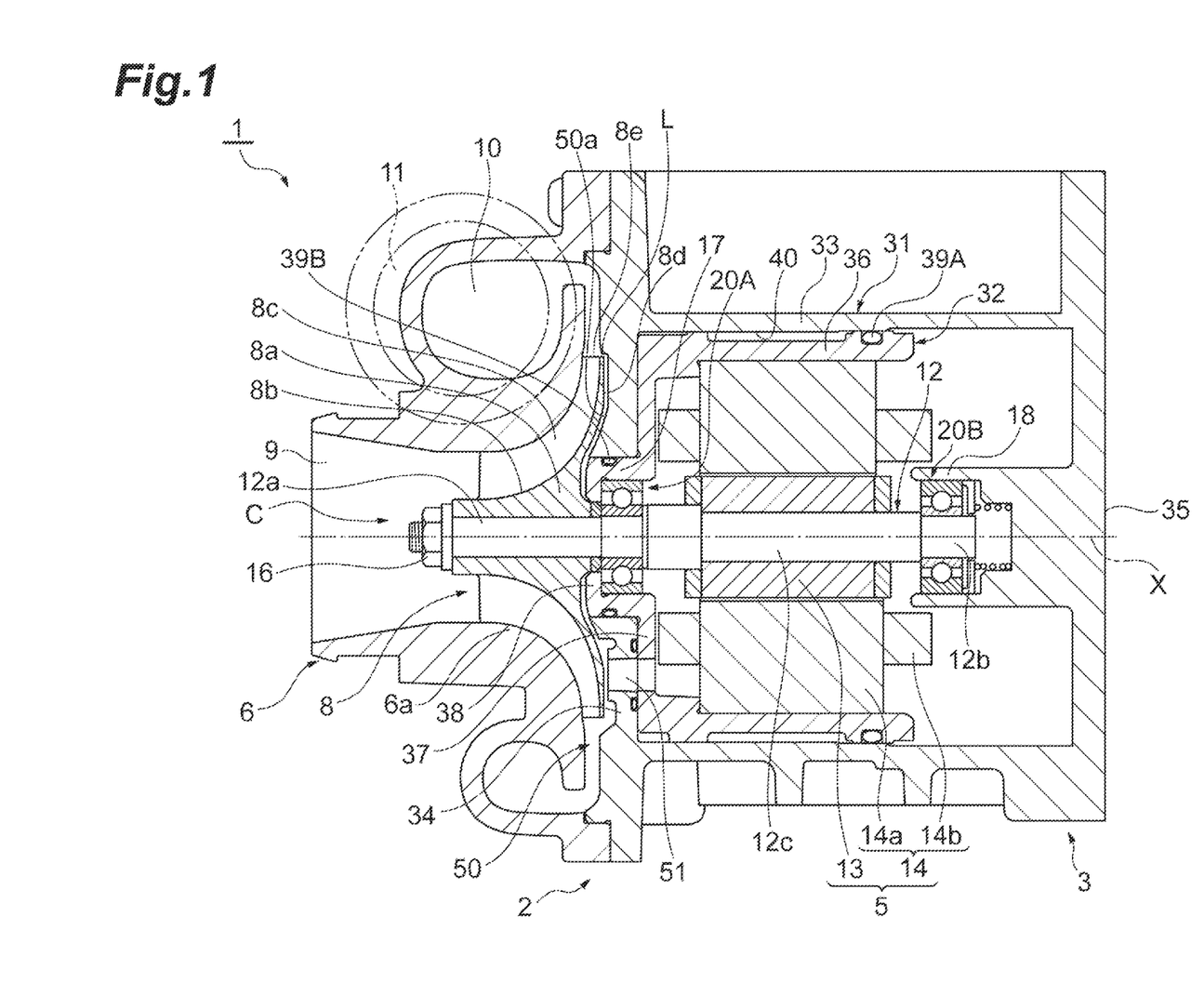
FIG. 1 is a cross-sectional view showing an electric compressor according to an example of the disclosure.

An electric compressor 1 according to an example will be described with reference to FIG. 1. As shown in FIG. 1, the electric compressor 1 is applied to an internal combustion engine of a vehicle or a ship, for example. The electric compressor 1 is a type of centrifugal compressor and includes a compressor 7. The electric compressor 1 rotates a compressor impeller 8 by an interaction of a rotor portion 13 and a stator portion 14, compresses a gas such as air and generates a compressed fluid such as compressed air. The rotor portion 13 and the stator portion 14 form a motor 5.

The electric compressor 1 may be connected to a turbocharger (not shown) applied to an internal combustion engine of a vehicle or a ship, for example. In that case, the electric compressor 1 delivers compressed air to a compressor of the turbocharger. The electric compressor 1 and the turbocharger are combined and the electric compressor 1 assists the turbocharger to start up.

The electric compressor 1 includes the rotation shaft 12 rotatably supported in a housing 2, and the compressor impeller 8 mounted on a first end 12a (a tip end portion) of the rotation shaft 12. The housing 2 includes a motor housing 3 which accommodates the rotor portion 13 and the stator portion 14, and a compressor housing 6 which accommodates the compressor impeller 8. The compressor housing 6 is provided on the first end side of the motor housing 3 (the left side in the drawing). The compressor housing 6 includes a suction port 9, a scroll portion 10, and a discharge port 11. An inverter, an inverter housing, and the like may be provided on the outer side of the motor housing 3 in a radial direction or on the second end side (the right side in the drawing).

The rotation shaft 12 has the rotation axis X. The rotation shaft 12 includes the first end 12a and a second end 12b (a base end portion) in the direction of the rotation axis X, and a central portion 12c between the first end 12a and the second end 12b. The second end 12b and the central portion 12c of the rotation shaft 12 are accommodated in the motor housing 3. The first end 12a of the rotation shaft 12 protrudes from the motor housing 3 on the rotation axis X and is located outside the motor housing 3. The first end 12a is disposed in the compressor housing 6.

The rotor portion 13 is mounted on the central portion 12c of the rotation shaft 12 and includes one or a plurality of permanent magnets (not shown) fixed to the rotation shaft 12. The stator portion 14 is held on an inner surface of the motor housing 3 to surround the rotor portion 13. That is, the stator portion 14 is disposed around the rotation shaft 12. The stator portion 14 includes a cylindrical core portion 14a disposed to surround the rotor portion 13, and a coil portion 14b formed by winding a conductive wire (not shown) around the core portion 14a. When an alternating current is applied to the coil portion 14b of the stator portion 14 through the conductive wire, the rotation shaft 12 and the compressor impeller 8 are integrally rotated by an interaction between the rotor portion 13 and the stator portion 14. When the compressor impeller 8 rotates, the compressor impeller 8 suctions external air through the suction port 9, compresses the air through the scroll portion 10 and then discharges the compressed air through the discharge port 11. The compressed air discharged from the discharge port 11 is supplied to the above-described internal combustion engine.

When the above-described configuration is explained from another point of view, the motor 5 including the rotor portion 13 and the coil portion 14b is disposed between the first end 12a and the second end 12b of the rotation shaft 12. The motor 5 is configured to rotate the rotation shaft 12 and the compressor impeller 8 when energized.

The electric compressor 1 includes first and second bearings 20A and 20B which rotatably support the rotation shaft 12 with respect to the housing 2. The first and second bearings 20A and 20B are provided inside the motor housing 3. The first and second bearings 20A and 20B are disposed to be spaced apart from each other in the direction of the rotation axis X and support the rotation shaft 12 at both sides thereof. The first bearing 20A is held by a cylindrical sleeve portion 17 formed on the compressor impeller 8 side of the motor housing 3. The second bearing 20B is held by a cylindrical sleeve portion 18 formed on the side of the motor housing 3 opposite to the compressor impeller 8. The motor 5 is disposed between the first bearing 20A and the second bearing 20B.

The compressor impeller 8 is mounted on the rotation shaft 12 by a shaft end nut 16 provided on the first end 12a of the rotation shaft 12, for example. The rotation shaft 12, the compressor impeller 8 fixed to the rotation shaft 12, the rotor portion 13, and the first and second bearings 20A and 20B integrally form a rotation body C in the housing 2.

Next, with reference to FIG. 1 and FIG. 2, a structure relating to the motor housing 3 and the compressor impeller 8 will be described in detail. The electric compressor 1 generates compressed air by rotation of the compressor impeller 8 in the compressor housing 6 and is configured to achieve a desired pressure balance inside the housing 2.

As shown in FIG. 1, the motor housing 3 includes a housing main body 31 disposed outside and an inner housing 32 disposed inside. The housing main body 31 and the inner housing 32 are separate bodies and are disposed concentrically with respect to the rotation axis X. The inner housing 32 surrounds and holds the stator portion 14. The housing main body 31 surrounds and holds the inner housing 32. The unitized inner housing 32 and stator portion 14 are mounted in the housing main body 31 by, tor example, interference-fitting (shrinkage-fitting, or the like).

The housing main body 31 includes an outer cylindrical portion 33 which extends in the direction of the rotation axis X, an outer end wall portion 34 which is continuously provided on the first end side of the outer cylindrical portion 33, and an end wall portion 35 which closes the second end side of the outer cylindrical portion 33. The outer end wall portion 34 has a disc shape and extends radially outward and inward from a first end of the outer cylindrical portion 33 (refer to also FIG. 3). For example, the compressor housing 6 is mounted on the motor housing 3 by fixing an outer peripheral edge portion of the compressor housing 6 to an outer peripheral edge portion of the outer end wall portion 34 with a bolt or the like. A circular opening 34f which passes through the rotation shaft 12 and a part of the inner housing 32 is formed in a center of the outer end wall portion 34.

The inner housing 32 includes an inner cylindrical portion 36 which extends in the direction of the rotation axis X, and an inner end wall portion 37 which is continuously provided om the first end side of the inner cylindrical portion 36. The inner end wall portion 37 has a disc shape and extends radially inward from a first end of the inner cylindrical portion 36. An opening 37f is formed in a center of the inner end wall portion 37. The sleeve portion 17 which holds the first bearing 20A is continuously provided at an edge portion including the opening 37f. An exposed wall portion 38 is provided at a tip end of the sleeve portion 17 which axially protrudes from the inner end wall portion 37 toward the compressor impeller 8. An opening 38f which allows the rotation shaft 12 to pass therethrough is formed in a center of the exposed wall portion 38.

The inner housing 32 is fitted into an inner surface of the housing main body 31. The outer cylindrical portion 33 of die housing main body 31 and the opening 34f of the outer end wall portion 34, the inner cylindrical portion 36 of the inner housing 32, the opening 37f of the inner end wall portion 37, the sleeve portion 17, and the opening 38f of the exposed wall portion 38 are formed concentrically with respect to the rotation axis X. The outer end wall portion 34 of the housing main body 31 and the inner end wall portion 37 of the inner housing 32 extend in a direction orthogonal to the rotation axis X. The inner cylindrical portion 36 is held in the outer cylindrical portion 33, and the inner end wall portion 37 is in contact with the outer end wall portion 34. The sleeve portion 17 of the inner housing 32 is fitted into the opening 34f of the outer end wall portion 34. The sleeve portion 17 is in contact with an inner peripheral surface (a peripheral surface forming the opening 34f) of the outer end wall portion 34. An outer ring of the first bearing 20A held by the sleeve portion 17 is in contact with the exposed wall portion 38 at an end portion on the compressor impeller 8 side in the direction of the rotation axis X. The exposed wall portion 38 is exposed to face the compressor impeller 8 (refer to FIG. 3).

For example, a water cooling jacket portion 40 for allowing cooling water to flow is formed between the outer cylindrical portion 33 of the housing main body 31 and the inner cylindrical portion 36 of the inner housing 32. The water cooling jacket portion 40 is formed on an outer peripheral surface of the inner cylindrical portion 36. An annular first seal member 39A may be provided between the outer cylindrical portion 33 and the inner cylindrical portion 36. Further, an annular second seal member 39B may be provided between the outer end wall portion 34 and the sleeve portion 17. The water cooling jacket portion 40 may be omitted.

Figure 2:
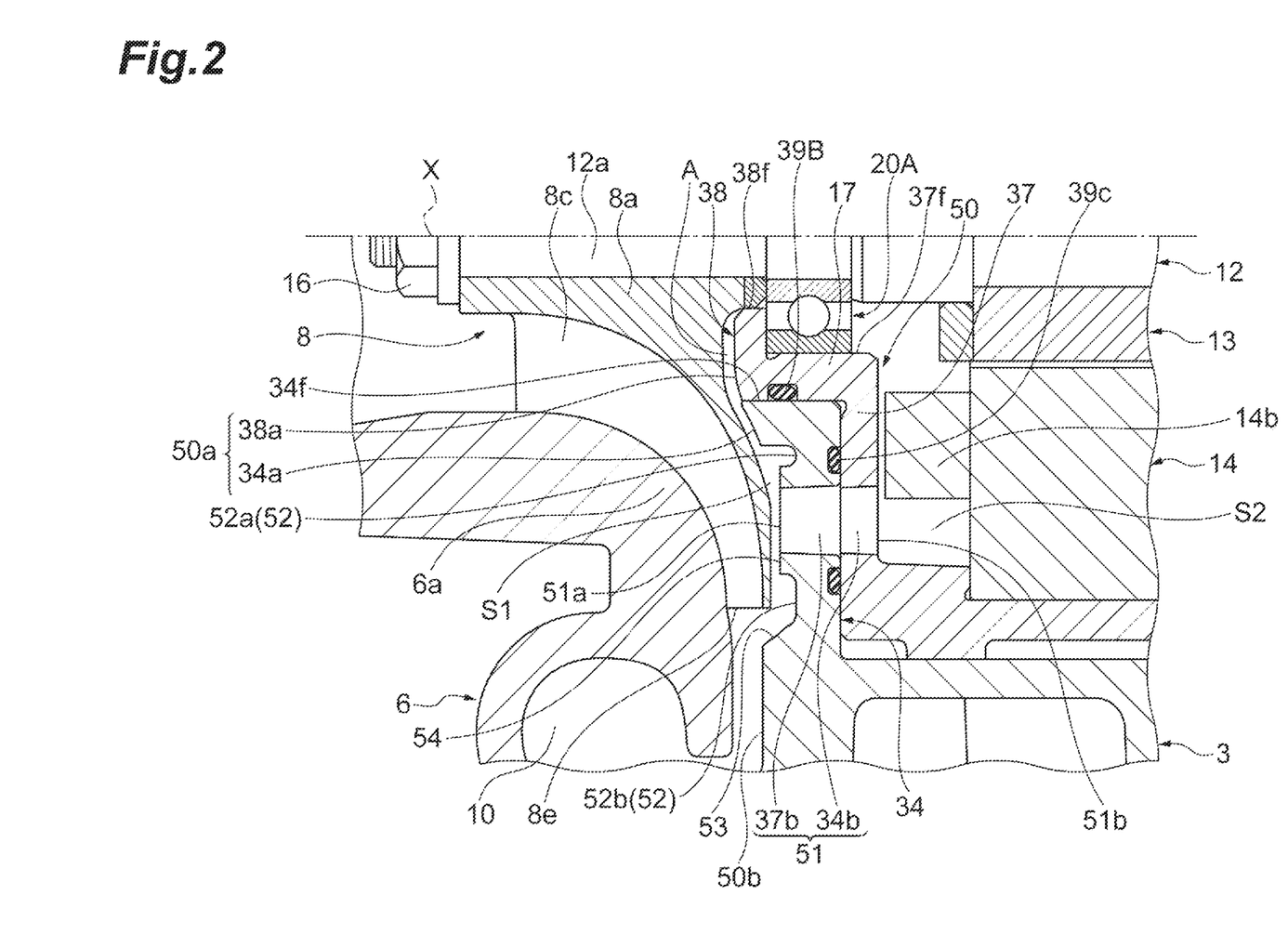
FIG. 2 is an enlarged cross-sectional view showing a vicinity of a through hole in FIG. 1.

As shown in FIGS. 1 and 2, the outer end wall portion 34 of the housing main body 31, the inner end wall portion 37 of the inner housing 32, the sleeve portion 17, and the exposed wall portion 38 integrally form an end wall portion (a wall portion) 50 of the motor housing 3. The end wall portion 50 is disposed between the compressor impeller 8 and the motor 5 and separates an impeller space S1 in which the compressor impeller 8 is present from a motor space S2 in which the motor 5 is present.

On the other hand, the compressor impeller 8 includes a hub portion 8a mounted on the first end 12a of the rotation shaft 12, and a plurality of blade portions 8c which extend from a curved hub surface 8b of the hub portion 8a in the radial direction and the direction of the rotation axis X. The plurality of blade portions 8c are disposed at a predetermined interval in the circumferential direction. The hub surface 8b of the hub portion 8a faces a shroud portion 6a of the compressor housing 6, and the plurality of blade portions 8c are disposed between the hub surface 8b and the shroud portion 6a. The hub portion 8a of the compressor impeller 8 has a back surface 8d on the side opposite to the hub surface 8b. In the example, the back surface 8d of the compressor impeller 8 is not flat but has a shape having a recessed portion, but the shape of the compressor impeller 8 may be appropriately changed. For example, the compressor impeller 8 may have a flat back surface.

The end wall portion 50 of the motor housing 3 is slightly spaced apart from the compressor impeller 8 in the direction of the rotation axis X. The end wall portion 50 faces the back surface 8d of the compressor impeller 8 with a gap A therebetween (refer to FIG. 2). The gap A is a part of the above-described impeller space S1. The end wall portion 50 includes a reference wall surface 50a (refer to FIGS. 1, 2, and 3) which faces the back surface 8d of the compressor impeller 8 and has a shape according to the back surface 8d. The reference wall surface 50a is formed, for example, so that the gap A is substantially constant, and has a shape corresponding to the back surface 8d. For example, when the back surface 8d has a concave surface, the reference wall surface 50a has a bulging surface corresponding to the concave surface. When the back surface 8d has a protruding or recessed conical surface, the reference wall surface 50a has a corresponding recessed or protruding conical surface. When the back surface 8d is flat, the reference wall surface 50a is also flat. The reference wall surface 50a is a fixed surface which can be determined by those skilled in the art in consideration of desired aerodynamic performance and the like when the shape of the back surface 8d of the compressor impeller 8 is determined.

More specifically, the end wall portion 50 includes an outer surface 38a of the exposed wall portion 38 and an outer surface 34a of the outer end wall portion 34. The outer surface 38a and the outer surface 34a are smoothly continuous. That is, a position of an outer peripheral edge of the outer surface 38a and a position of an inner peripheral edge of the outer surface 34a coincide with each other, and no step is formed between the outer surface 38a and the outer surface 34a. Even if a step is formed between them, a size of the step should be negligible. Although the reference wall surface 50a extends along the back surface 8d of the compressor impeller 8, a wall surface (an annular surface 50b) of the end wall portion 50 may further protrude, for example, in the direction of the rotation axis X on the outer peripheral side of the reference wall surface 50a (the outer side in the radial direction further than a trailing edge 8e of the compressor impeller 8). In that case, for example, the flat annular surface 50b orthogonal to the rotation axis X is formed. The annular surface 50b forms a diffuser flow path with the compressor housing 6 therebetween.

In the electric compressor 1, one bypass hole 51 is formed in the end wall portion 50 to reduce a pressure difference between the impeller space S1 and the motor space S2 during an operation thereof. The bypass hole 51 includes, for example, an outer through hole 34b formed in the outer end wall portion 34 and an inner through hole 37b formed in the inner end wall portion 37. Each of the outer through hole 34b and the inner through hole 37b is, for example, a cylindrical hole portion which extends in the direction of the rotation axis X and they are arranged in a line to communicate with each other. The bypass hole 51 including the outer through hole 34b and the inner through hole 37b connects the impeller space S1 to the motor space S2. The bypass hole 51 includes a first opening 51a which opens into die impeller space S1 and a second opening 51b which opens into the motor space S2. The first opening 51a is a circle in which the outer through hole 34b and the outer surface 34a intersect, and is an end edge of the bypass hole 51 on the impeller space S1 side. The first opening 51a is formed at a position at which it faces the back surface 8d of the compressor impeller 8. The second opening 51b is a circle in which the inner through hole 37b and the back surface of the inner end wall portion 37 intersect, and is an end edge of the bypass hole 51 on the motor space S2 side. The first opening 51a is an opening on the impeller space S1 side, and the second opening 51b is an opening on the motor space S2 side.

A magnitude relationship between a pressure in the impeller space S1 and a pressure in the motor space S2 may change due to an operation state of the electric compressor 1 or a rotation speed of the compressor impeller 8. In other words, a direction of air flowing through the bypass hole 51 changes according to the operation state of the electric compressor 1 or the rotation speed of the compressor impeller 8. Specifically, when the rotation speed of the compressor impeller 8 is increased from that in an operation stopped state, the pressure increases due to the rotation of the compressor impeller 8, and thus the pressure in the impeller space S1 may momentarily become higher than the pressure in the motor space S2. Since the air in the impeller space S1 flows into the motor space S2 through the bypass hole 51 over time, the pressure in the impeller space S1 becomes substantially equal to the pressure in the motor space S2. Further, when the rotation speed of the compressor impeller 8 is decreased, a discharge pressure from the compressor impeller 8 is decreased, thus the pressure of the impeller space S1 is decreased, and the pressure in the impeller space S1 can be made lower than the pressure in the motor space S2. In this case, the air in the motor space S2 flows into the impeller space S1 through the bypass hole 51.

The bypass hole 51 may have any shape as long as the bypass hole 51 can connect the two spaces. The bypass hole 51 may have a prismatic shape. Shapes of the first opening 51a and the second opening 51b may change according to the shape of the bypass hole 51. The bypass hole 51 may extend in a direction having an angle with respect to the rotation axis X. An annular third seal member 39C which surrounds the bypass hole 51 may be provided between the outer end wall portion 34 and the inner end wall portion 37.

In the electric compressor 1, one bypass hole 51 is formed immediately below the rotation shall 12. In the specification, "lower" or "upper" is based on an attitude in which the electric compressor 1 is used (that is, installed in a vehicle or a ship). The bypass hole 51 is formed, for example, at a position in which it overlaps a vertical plane passing through the rotation shaft 12. That is, the bypass hole 51 is disposed below the rotation shall 12. The bypass hole 51 is formed within a range of a radius of the compressor impeller 8 with the rotation axis X as a reference.

Figure 3:
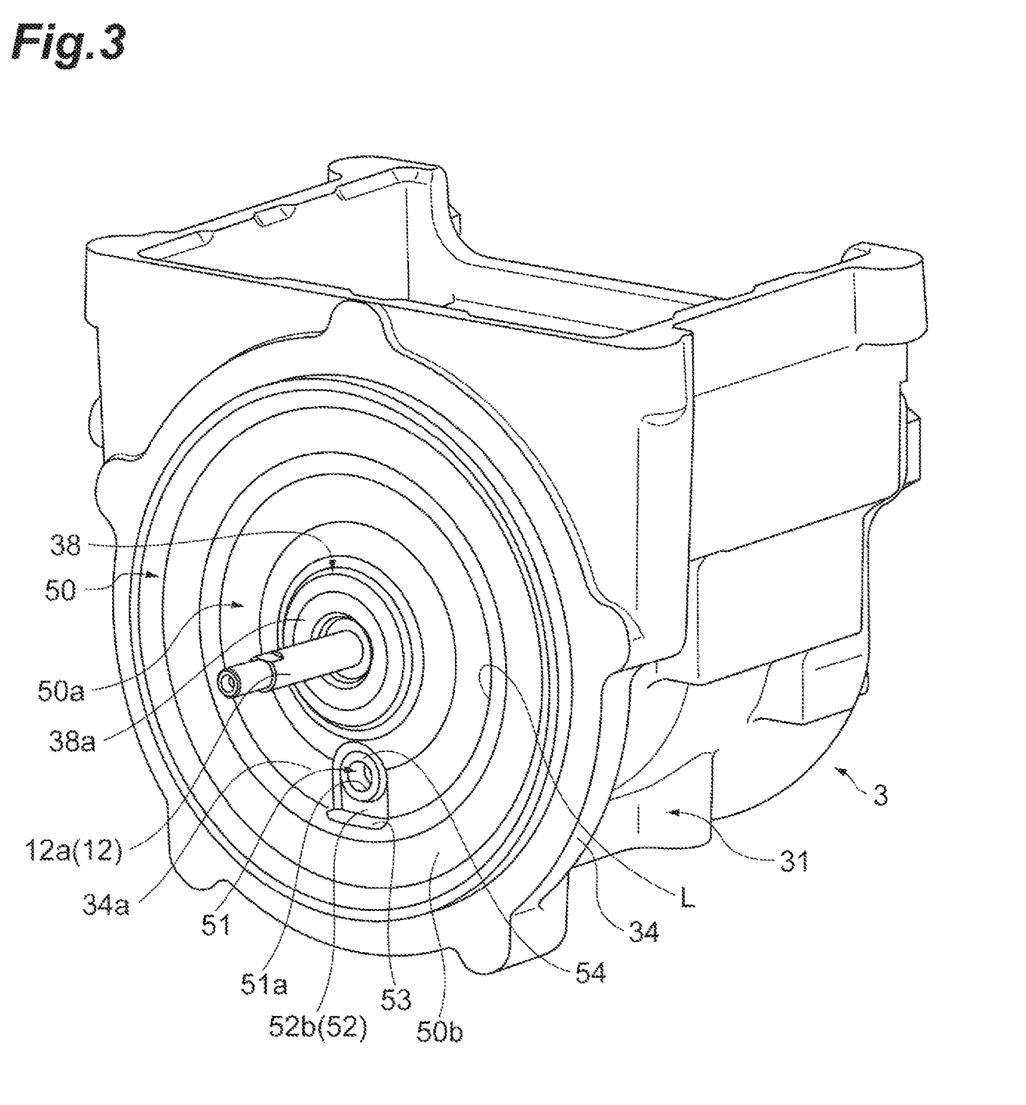
FIG. 3 is a perspective view of a motor housing when seen from an end wall side.
Figure 4:
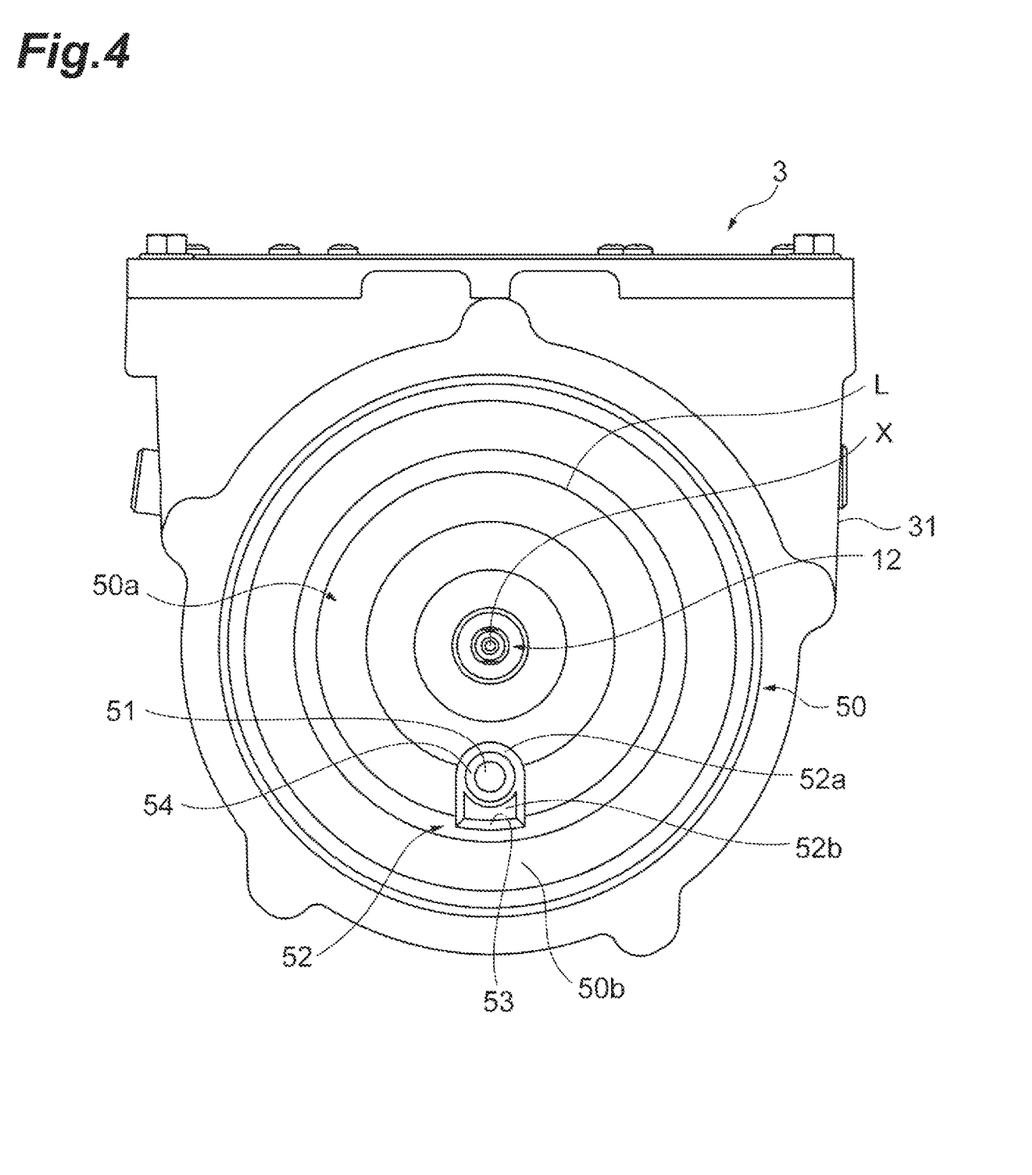
FIG. 4 is a front view of the end wall side of the motor housing.

Further, a recessed portion 52 which is recessed from the first opening 51a and the reference wall surface 50a is formed in a surface (a surface facing the compressor impeller 8) of the end wall portion 50 in the vicinity of the bypass hole 51. As shown in FIGS. 3 and 4, the recessed portion 52 is disposed around the first opening 51a. More specifically, the recessed portion 52 is disposed around the entire circumference of the first opening 51a. The recessed portion 52 surrounds the first opening 51a. A hole end surface 54 along an extension surface of die reference wall surface 50a is formed between the first opening 51a and the recessed portion 52. That is, the first opening 51a and the hole end surface 54 are located at the same position as the reference wall surface 50a (a position in the direction of the rotation axis X). A depth of the recessed portion 52 can be set appropriately. Also, the first opening 51a may be recessed further than the reference wall surface 50a in the direction of the rotation axis X. That is, the first opening 51a may be located on the second end 12b side (the right side in FIGS. 1 and 2) further than the reference wall surface 50a in the direction of the rotation axis X. In other words, the first opening 51a and the hole end surface 54 do not protrude further than the reference wall surface 50a in the direction of the rotation axis X (to the compressor impeller 8 side). The first opening 51a and the hole end surface 54 do not protrude into the gap A.

As shown in FIG. 4, the recessed portion 52 includes a semicircular groove portion 52a formed along an upper half of the first opening 51a, and a substantially rectangular recessed portion 52b formed along a lower half of the first opening 51a. A discharge surface 53 which faces the impeller space S1 is formed at a lower end of the recessed portion 52, that is, a lower end of the recessed portion 52b. The discharge surface 53 is inclined with respect to the rotation axis X and connects a bottom portion of the recessed portion 52b to the annular surface 50b. The discharge surface 53 extends downward (outward in the radial direction) from a position of the trailing edge 8e of the compressor impeller 8. That is, a line of intersection between the discharge surface 53 and the annular surface 50b is located radially outward from the trailing edge 8e of the compressor impeller 8. In other words, the discharge surface 53 is formed at a position at which it overlaps a circular boundary line L of the end wall portion 50 corresponding to the trailing edge 8e (an outer diameter) of the compressor impeller 8 (refer to FIGS. 1, 3, and 4). That is, the recessed portion 52 is formed within the range of the radius of the compressor impeller 8 with the rotation axis X as a reference, for example, and the discharge surface 53 is formed to cross the radius (in a region including the radius).

During the operation of the electric compressor 1 according to the example, the bypass hole 51 which connects the impeller space S1 to the motor space S2 reduces the pressure difference between these two spaces. Then, when a temperature of the electric compressor 1 is reduced after the operation is stopped, condensed water may adhere to the end wall portion 50 facing the back surface 8d of the compressor impeller 8, and the like. The condensed water flows down on the reference wall surface 50a, for example. For example, the condensed water flows on the reference wall surface 50a in the circumferential direction. Then, when the condensed water flows near the bypass hole 51, the condensed water flows into the recessed portion 52 disposed around the first opening 51a of the bypass hole 51. Since the recessed portion 52 is recessed from the first opening 51a and the reference wall surface 50a, the condensed water can be stored therein. Therefore, the recessed portion 52 curbs entering of the condensed water into the bypass hole 51 from the first opening 51a. According to the electric compressor 1, the entering of condensed water into the motor space S2 through the bypass hole 51 is curbed.

Since the bypass hole 51 is disposed below the rotation shaft 12, more condensed water can be guided to the recessed portion 52. The collection of the condensed water is realized.

Since the recessed portion 52 is formed on the entire circumference of the first opening 51a of the bypass hole 51, the condensed water flowing near the bypass hole 51 is guided to the recessed portion 52. Since there is no path which connects the reference wall surface 50a to the first opening 51a, an introduction of the condensed water into the bypass hole 51 is prevented.

Since the discharge surface 53 which is inclined with respect to the rotation axis X is formed at the lower end of the recessed portion 52, the condensed water which has introduced into the recessed portion 52 flows on the discharge surface 53 and drops downward. Although a capacity of the recessed portion 52 is limited, the condensed water in the recessed portion 52 can be smoothly discharged through the inclined discharge surface 53.

When the first opening 51a protrudes toward the first end 12a side further than the reference wall surface 50a, the first opening 51a comes close to the back surface 8d of the compressor impeller 8. This may affect the aerodynamic performance of the compressor 7. When the first opening 51a of the bypass hole 51 is at a position in the above-described configuration, the pressure difference between the impeller space S1 and the motor space S2 can be reduced without affecting the aerodynamic performance of the compressor 7.

Further, since the discharge surface 53 is formed below the trailing edge 8e of the compressor impeller 8 (outward in the radial direction), the condensed water discharged through the discharge surface 53 flows out toward the diffuser flow path. For example, the condensed water reaches the scroll portion 10 and is then appropriately discharged.

It is to be understood that not all aspects, advantages and features described herein may necessarily be achieved by, or included in, any one particular example. Indeed, having described and illustrated various examples herein, it should be apparent that other examples may be modified in arrangement and detail. For example, the position of the bypass hole is not limited to the position in the above-described example. The bypass hole may be formed not at the position directly below the rotation shaft 12 but at a position displaced to left or right side from the position immediately below the rotation shaft 12. The bypass hole may be disposed below the rotation shaft 12. That is, the bypass hole may be disposed below the lower end of the rotation shaft 12. Further, the bypass hole may be disposed below the rotation axis X and above the lower end of the rotation shaft 12, or may be disposed above the rotation axis X. Even when the bypass hole is disposed above the rotation shaft 12, the pressure difference can be reduced. Further, it is possible to curb entering of condensed water into the bypass hole by collecting the condensed water flowing down on the reference wall surface in the recessed portion.

The number of bypass holes is not limited to one, and a plurality of bypass holes may be formed in the wall portion. The above-described free arrangement may be applied to each of the plurality of bypass holes. One of the plurality of bypass holes may be disposed immediately below the rotation shaft 12. Two or more bypass holes may be disposed symmetrically with respect to the vertical plane passing through the rotation shaft 12.

The recessed portion may be formed only in a part around the first opening of die bypass hole. For example, the recessed portion may be a U-shaped groove portion which is formed above and on a side (both sides or one side) of the first opening and not be formed below the first opening. That is, the recessed portion may be formed only in the upper half of the first opening. The recessed portion may be formed only immediately above the first opening. In these cases, the recessed portion is a groove portion having a pair of end portions, and the discharge surface may be connected to the end portions of the groove portion.

The discharge surface may not be formed at the lower end of the recessed portion. When the discharge surface is omitted, a wall surface parallel to the rotation axis or a wall surface which is inclined with respect to the rotation axis, does not face the impeller space and faces the inside of the recessed portion may be formed at the lower end of the recessed portion.

The first opening of the bypass hole may protrude farther toward the first end side (within the gap A) than the reference wall surface of the wall portion.

The motor housing 3 is not limited to the structure having the housing main body 31 and the inner housing 32. The motor housing 3 may not be divided into a plurality of members and may have an integral structure. In that case, the bypass hole 51 may be a single hole portion formed in one wall portion. Other known structures may be adopted as the basic structure of the motor housing 3 except for the characteristic parts of the electric compressor of the disclosure (the bypass hole 51, the recessed portion 52, and the like).

In the above-described example, although the structure in which the end wall portion 50 is a part of the motor housing 3 has been described, the end wall portion 50 may be provided separately from the motor housing 3. For example, a plate-shaped wall portion may be disposed between the compressor housing 6 and the motor housing 3. Also in this case, the wall portion separates the impeller space S1 and the motor space S2 from each other and faces the back surface 8d of the compressor impeller 8. The bypass hole and the recessed portion are formed in this wall portion.

Furthermore, one or more of the examples described above may be applied to an electric compressor including a turbine.

We claim:

1. An electric compressor comprising:
   a rotation shaft having a rotation axis and comprising a first end and a second end in a direction of the rotation axis;
   a compressor impeller mounted on the first end of the rotation shaft and comprising a back surface facing the second end;
   a motor disposed between the first end and the second end of the rotation shaft and configured to rotate the rotation shaft and the compressor impeller;
   a wall portion disposed between the compressor impeller and the motor and configured to separate an impeller space in which the compressor impeller is located from a motor space in which the motor is located, the wall portion comprising:
     a reference wall surface that faces the back surface of the compressor impeller and has a shape along the back surface;
     a bypass hole that passes through the wall portion, is configured to connect the impeller space to the motor space, and comprises an opening at an end of the bypass hole that opens into the impeller space; and
     a recessed portion that is disposed around the opening and is recessed from the opening and the reference wall surface; and
   a motor housing accommodating the motor in the motor space,
   wherein a part of the motor housing forms the wall portion,
   wherein the motor housing further comprises a housing main body and an inner housing which is disposed concentrically inside the housing main body with respect to the rotation axis,
   wherein the housing main body comprises a disc shaped outer end wall portion,
   wherein the inner housing comprises a disc shaped inner end wall portion, and wherein the outer end wall portion and the inner end wall portion combine to form the wall portion.

2. The electric compressor according to claim 1, wherein the bypass hole is disposed below the rotation axis.

3. The electric compressor according to claim 2, wherein the bypass hole is disposed directly below the rotation axis.

4. The electric compressor according to claim 1, wherein the bypass hole is disposed on an imaginary vertical plane passing through the rotation shaft.

5. The electric compressor according to claim 1, wherein the recessed portion at least partially surrounds the opening.

6. The electric compressor according to claim 5, wherein the recessed portion is a U-shaped groove portion that surrounds an upper half of the opening.

7. The electric compressor according to claim 1, wherein a wall surface which is inclined with respect to the rotation axis and faces an inside of the recessed portion is formed at a lower end of the recessed portion.

8. The electric compressor according to claim 1, wherein the opening is located at a same position as the reference wall surface in the direction of the rotation axis, or at a position toward the second end from the reference wall surface in the direction of the rotation axis.

9. The electric compressor according to claim 1, wherein the housing main body comprises:
an outer cylindrical portion which extends in the direction of the rotation axis; and
the disc shaped outer end wall portion that is disposed at a side of the outer cylindrical portion which is closer to the first end of the rotation shaft than to the second end of the rotation shaft, and
wherein the inner housing comprises:
an inner cylindrical portion which extends in the direction of the rotation axis; and
the disc shaped inner end wall portion that is disposed at a side of the inner cylindrical portion which is closer to the first end of the rotation shaft than to the second end of the rotation shaft.

10. The electric compressor according to claim 9, wherein the inner cylindrical portion is held in the outer cylindrical portion, and the inner end wall portion is in contact with the outer end wall portion so that the inner housing is fitted into the housing main body,
wherein the bypass hole comprises an outer through hole formed in the outer end wall portion and an inner through hole formed in the inner end wall portion, and
wherein the outer through hole and the inner through hole are linearly aligned with each other so as to communicate with each other in the direction of the rotation axis.

11. The electric compressor according to claim 1, further comprising a motor housing accommodating the motor in the motor space,
wherein the wall portion is a separate structure from the motor housing.

12. An electric compressor comprising:
a rotation shaft having a rotation axis and comprising a first end and a second end in a direction of the rotation axis;
a compressor impeller mounted on the first end of the rotation shaft and comprising a back surface facing the second end;
a motor disposed between the first end and the second end of the rotation shaft and configured to rotate the rotation shaft and the compressor impeller; and
a wall portion disposed between the compressor impeller and the motor and configured to separate an impeller space in which the compressor impeller is located from a motor space in which the motor is located, the wall portion comprising:
a reference wall surface that faces the back surface of the compressor impeller and has a shape along the back surface;
a bypass hole that passes through the wall portion, is configured to connect the impeller space to the motor space, and comprises an opening at an end of the bypass hole that opens into the impeller space; and
a recessed portion that is disposed around the opening and is recessed from the opening and the reference wall surface,
wherein the recessed portion surrounds an entire circumference of the opening.

13. The electric compressor according to claim 12, wherein the recessed portion comprises:
a semicircular groove portion formed along an upper half of the opening; and
a rectangular recessed portion formed along a lower half of the opening.

14. An electric compressor comprising:
a rotation shaft having a rotation axis and comprising a first end and a second end in a direction of the rotation axis;
a compressor impeller mounted on the first end of the rotation shaft and comprising a back surface facing the second end;
a motor disposed between the first end and the second end of the rotation shaft and configured to rotate the rotation shaft and the compressor impeller; and
a wall portion disposed between the compressor impeller and the motor and configured to separate an impeller space in which the compressor impeller is located from a motor space in which the motor is located, the wall portion comprising:
a reference wall surface that faces the back surface of the compressor impeller and has a shape along the back surface;
a bypass hole that passes through the wall portion, is configured to connect the impeller space to the motor space, and comprises an opening at an end of the bypass hole that opens into the impeller space; and
a recessed portion that is disposed around the opening and is recessed from the opening and the reference wall surface,
wherein a discharge surface which is inclined with respect to the rotation axis and is directed toward the impeller space is formed at a lower end of the recessed portion.

15. The electric compressor according to claim 14, wherein the recessed portion is formed within a range of a radius of the compressor impeller with the rotation axis as a reference, and the discharge surface is formed in a region including the radius so as to cross the radius.

* * * * *